(12) United States Patent
Balde et al.

(10) Patent No.: US 11,483,223 B1
(45) Date of Patent: Oct. 25, 2022

(54) CONTINUITY OF VIDEO CALLS USING ARTIFICIAL FRAMES BASED ON IDENTIFIED FACIAL LANDMARKS

(71) Applicant: QUALCOMM Incorporated, San Diego, CA (US)

(72) Inventors: Ansh Abhay Balde, Sambalpur (IN); Venkata Phani Krishna Akella, Hyderabad (IN); Rajesh Polisetti, Hyderabad (IN); Hemanth Yerva, Hyderabad (IN); Sandeep Padubidri Ramamurthy, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/217,857

(22) Filed: Mar. 30, 2021

(51) Int. Cl.
| | |
|---|---|
| *H04L 43/0829* | (2022.01) |
| *H04W 36/02* | (2009.01) |
| *H04L 43/0817* | (2022.01) |
| *H04L 12/18* | (2006.01) |
| *H04W 56/00* | (2009.01) |
| *G06N 3/08* | (2006.01) |
| *G06V 40/16* | (2022.01) |

(52) U.S. Cl.
CPC .......... *H04L 43/0829* (2013.01); *G06N 3/08* (2013.01); *G06V 40/169* (2022.01); *H04L 12/1827* (2013.01); *H04L 43/0817* (2013.01); *H04W 36/023* (2013.01); *H04W 56/003* (2013.01)

(58) Field of Classification Search
CPC ............ H04L 12/1827; H04L 43/0817; H04L 43/0829; H04W 36/023; H04W 56/003; G06N 3/08; G06V 40/169

USPC ......................................................... 709/224
See application file for complete search history.

(56) References Cited

U.S. PATENT DOCUMENTS

| | | | |
|---|---|---|---|
| 8,867,013 B2 * | 10/2014 | Krishnakumar ..... | G06V 40/161 349/180 |
| 10,306,182 B2 * | 5/2019 | Perraud ............... | H04W 36/023 |

(Continued)

OTHER PUBLICATIONS

3GPP TR 22.804, "3rd Generation Partnership Project, Technical Specification Group Services and System Aspects, Study on Communication for Automation in Vertical Domains(Release 16)", 3GPP TR 22.804, V2.0.0, May 31, 2018, pp. 1-188.

(Continued)

*Primary Examiner* — David P Zarka
(74) *Attorney, Agent, or Firm* — Campbell C. Chiang; Procopio, Cory, Hargreaves & Savitch LLP

(57) ABSTRACT

The present disclosure relates to methods and devices for wireless communication of an apparatus, e.g., a UE. In one aspect, the apparatus may determine whether a connection of a video call is interrupted, the video call including a plurality of decoded frames. The apparatus may also determine, if the connection of the video call is interrupted, whether one or more decoded frames of the plurality of decoded frames are suitable for artificial frame generation. The apparatus may also generate one or more artificial frames based on the one or more decoded frames and an audio feed from a transmitting device. Additionally, the apparatus may determine whether the one or more artificial frames are suitable for a facial model call. The apparatus may also establish a facial model call based on a combination of the one or more artificial frames and the audio feed from the transmitting device.

26 Claims, 10 Drawing Sheets

(56) References Cited

U.S. PATENT DOCUMENTS

| | | | | |
|---|---|---|---|---|
| 10,904,488 B1* | 1/2021 | Weisz | | H04N 7/152 |
| 11,144,772 B2* | 10/2021 | Li | | G06V 10/993 |
| 2007/0249357 A1* | 10/2007 | Aveline | | H04W 76/20 |
| | | | | 455/445 |
| 2010/0135580 A1* | 6/2010 | Liu | | G06V 40/168 |
| | | | | 382/195 |
| 2011/0279640 A1* | 11/2011 | Choi | | H04N 21/4788 |
| | | | | 348/14.12 |
| 2014/0211860 A1* | 7/2014 | Zhao | | H04N 19/167 |
| | | | | 375/240.27 |
| 2014/0211969 A1* | 7/2014 | Kim | | H03G 3/04 |
| | | | | 381/109 |
| 2015/0188972 A1* | 7/2015 | Matthews | | H04N 19/503 |
| | | | | 348/14.15 |
| 2016/0006987 A1* | 1/2016 | Li | | H04L 12/1827 |
| | | | | 348/14.03 |
| 2016/0105670 A1 | 4/2016 | Pang et al. | | |
| 2016/0134840 A1* | 5/2016 | McCulloch | | G06V 40/165 |
| | | | | 348/14.03 |
| 2017/0032178 A1* | 2/2017 | Henry | | G06V 40/175 |
| 2017/0104993 A1 | 4/2017 | Jeong et al. | | |
| 2018/0124355 A1 | 5/2018 | Perraud | | |
| 2018/0124359 A1* | 5/2018 | Faulkner | | H04L 65/403 |
| 2019/0246102 A1 | 8/2019 | Cho et al. | | |
| 2021/0312523 A1* | 10/2021 | Luo | | G06F 3/0488 |

OTHER PUBLICATIONS

Chen L., et al., "What Comprises a Good Talking-Head Video Generation?: A Survey and Benchmark", arxiv.org, Cornell University Library, 201 Olin Library Cornell University Ithaca, NY 14853, May 7, 2020 (May 7, 2020), 30 Pages, XP081670002, The whole document.

International Search Report and Written Opinion—PCT/US2022/018554—ISA/EPO—dated Jun. 10, 2022.

* cited by examiner

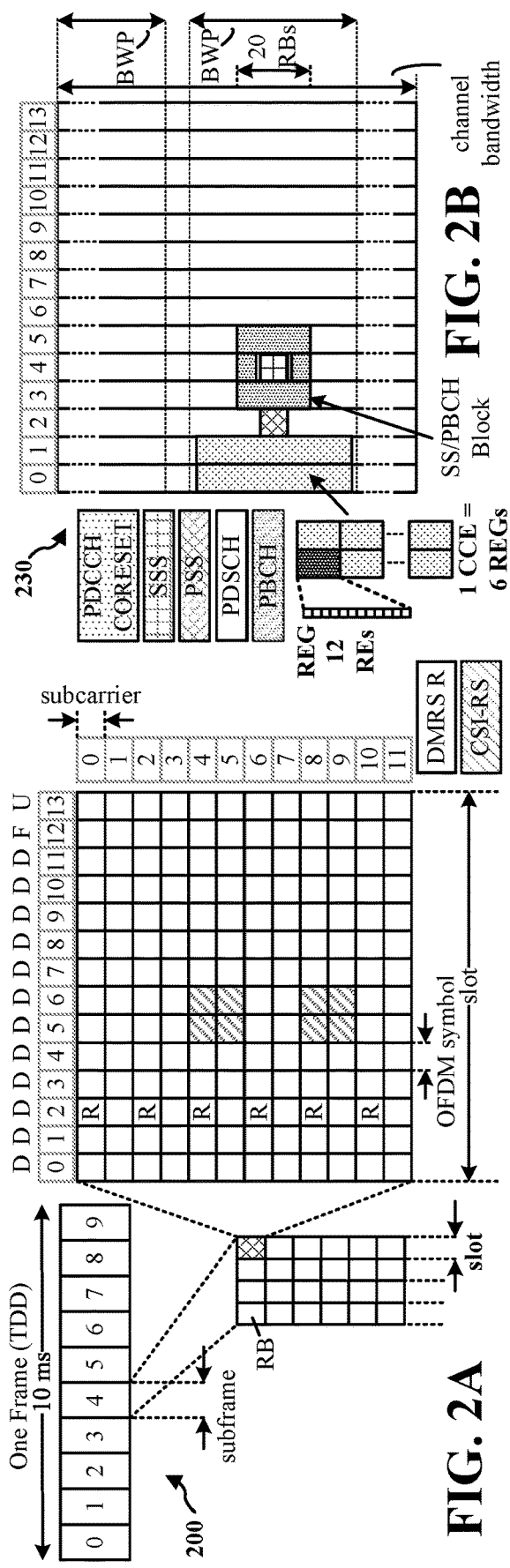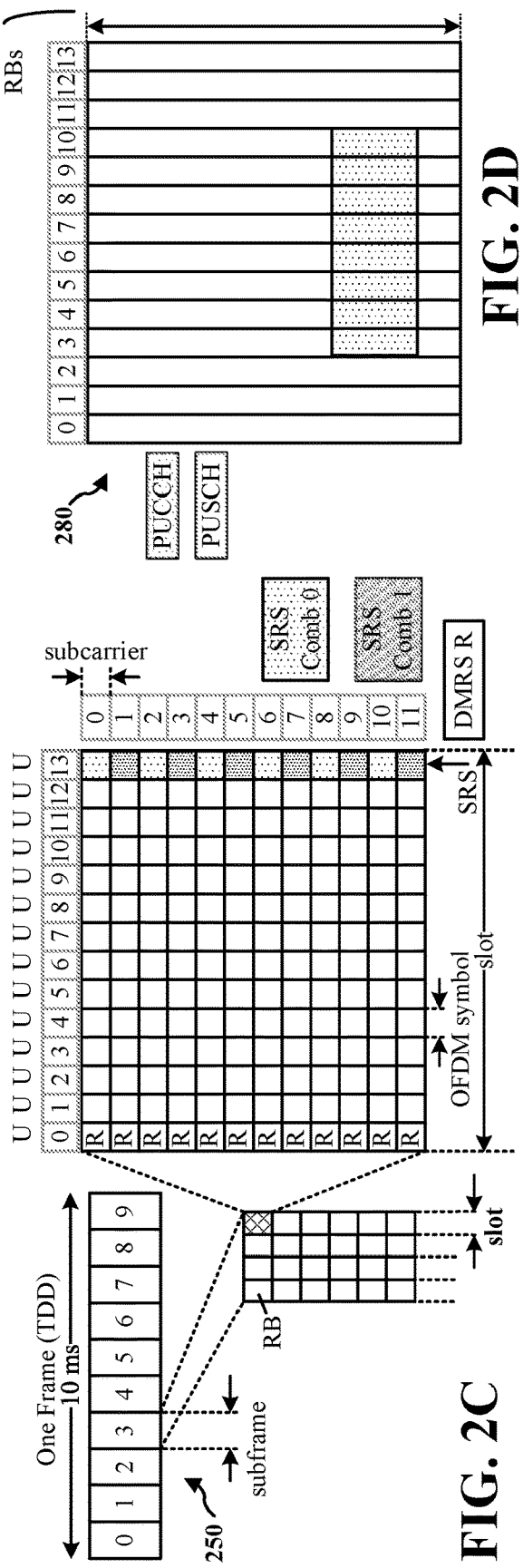
FIG. 2A  FIG. 2B  FIG. 2C  FIG. 2D

CONTINUITY OF VIDEO CALLS USING ARTIFICIAL FRAMES BASED ON IDENTIFIED FACIAL LANDMARKS

BACKGROUND

Technical Field

The present disclosure relates generally to communication systems, and more particularly, to video calls in wireless communication systems. Introduction Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be wireless device or a user equipment (UE). The apparatus may receive a plurality of frames for the video call; and decode each of the plurality of frames for the video call, such that the plurality of frames corresponds to the plurality of decoded frames. The apparatus may also determine whether a connection of a video call is interrupted, the video call including a plurality of decoded frames. The apparatus may also determine, if the connection of the video call is interrupted, whether a threshold amount of the plurality of frames have been received, where the one or more decoded frames are determined to be suitable based on whether the threshold amount of the plurality of frames have been received. Additionally, the apparatus may determine, if the connection of the video call is interrupted, whether one or more decoded frames of the plurality of decoded frames are suitable for artificial frame generation. The apparatus may also identify, if the one or more decoded frames are suitable for artificial frame generation, one or more facial landmarks in each of the one or more decoded frames, where each of the one or more artificial frames are generated based on the one or more facial landmarks. The apparatus may also generate, if the one or more decoded frames are suitable, one or more artificial frames based on the one or more decoded frames and an audio feed from a transmitting device of the video call. Moreover, the apparatus may determine, upon generating the one or more artificial frames, whether the one or more artificial frames are suitable for a facial model call. The apparatus may also combine, upon determining that the one or more artificial frames are suitable, the one or more artificial frames with the audio feed of the transmitting device. The apparatus may also establish, if the one or more artificial frames are suitable, a facial model call based on a combination of the one or more artificial frames and the audio feed from the transmitting device. Further, the apparatus may switch from the facial model call to a traditional video call when the connection of the video call is no longer interrupted.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
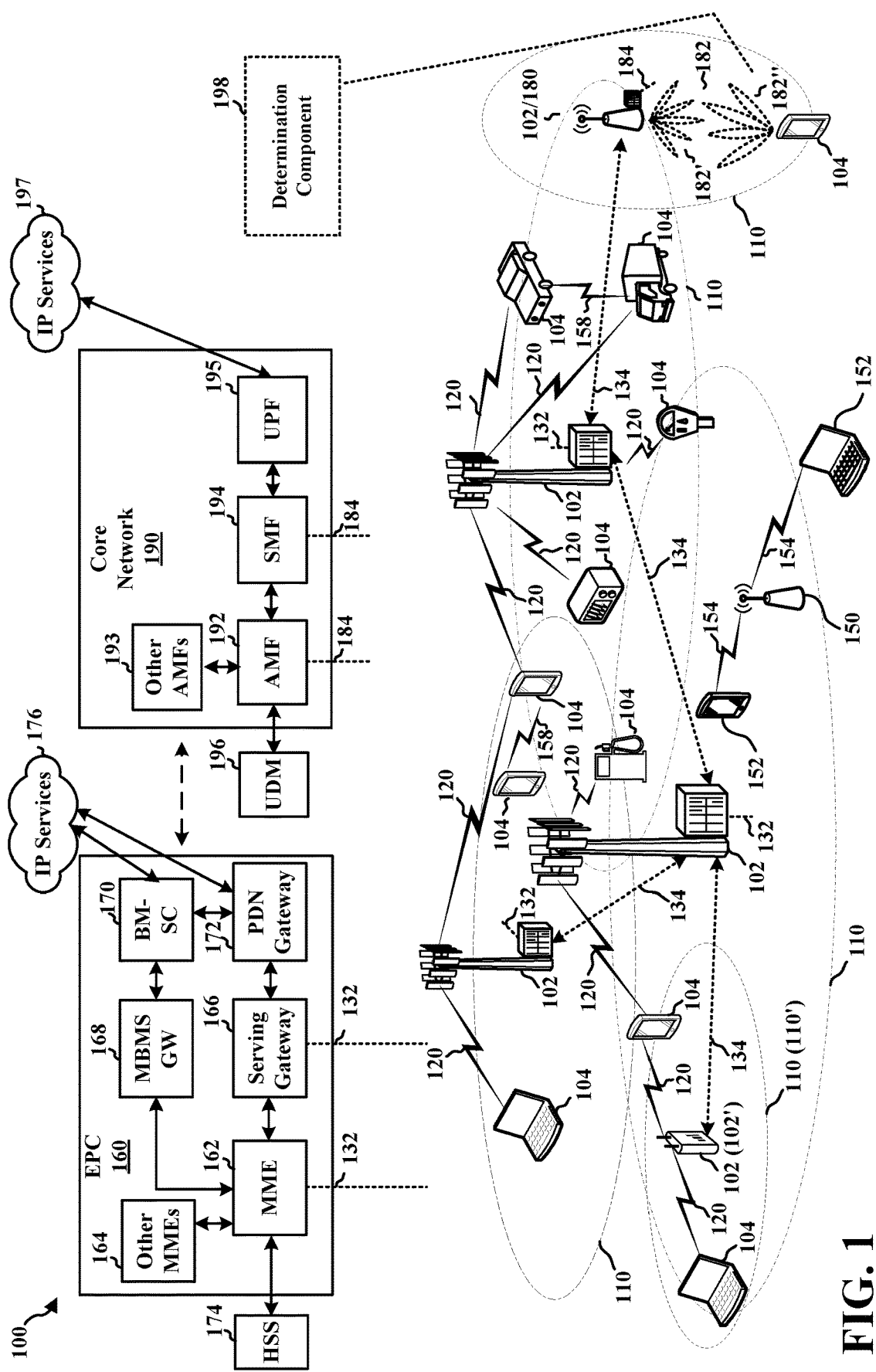
FIG. 1 is a diagram illustrating an example of a wireless communications system and an access network.

As wireless technology for video calls becomes increasingly advanced, e.g., with 4G LTE and 5G new radio (NR) technologies, network connectivity issues still remain prevalent. In some instances, these network connectivity issues may result in the continuity of video calls becoming hampered or interrupted. For example, multiple devices, e.g., device A and device B, may be communicating via a normal video call, but device A may experience a connectivity issue. That is, device A's frames may drop or device A may shift to an audio call. Although device B never experienced a connectivity issue, device B may still suffer from device A's connectivity issue. Accordingly, it can be irritating to a user of device B to experience a video call interruption when there was no connectivity issue on their end. In some aspects of video calls, a call interruption or connectivity issue may result in one or more frames of the call being dropped. Further, in some aspects of video calls with multiple devices, one device's frames may drop, e.g., device A, and the other device, e.g., device B, may suffer a call interruption or connectivity issue. Aspects of the present disclosure may provide a solution for video call interruptions and/or network connectivity issues during video calls. For instance, aspects of the present disclosure may help to maintain video call connections at one device when one or more frames are dropped from another device. Moreover, aspects of the present disclosure may allow for one device to maintain network connectivity during a video call when another device experiences connectivity issues.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a determination component 198 configured to receive a plurality of frames for the video call; and decode each of the plurality of frames for the video call, such that the plurality of frames corresponds to the plurality of decoded frames. Determination component 198 may also be configured to determine whether a connection of a video call is interrupted, the video call including a plurality of decoded frames. Determination component 198 may also be configured to determine, if the connection of the video call is interrupted, whether a threshold amount of the plurality of frames have been received, where the one or more decoded frames are determined to be suitable based on whether the threshold amount of the plurality of frames have been received. Determination component 198 may also be configured to determine, if the connection of the video call is interrupted, whether one or more decoded frames of the plurality of decoded frames are suitable for artificial frame generation. Determination component 198 may also be configured to identify, if the one or more decoded frames are suitable for artificial frame generation, one or more facial landmarks in each of the one or more decoded frames, where each of the one or more artificial frames are generated based on the one or more facial landmarks. Determination component 198 may also be configured to generate, if the one or more decoded frames are suitable, one or more artificial frames based on the one or more decoded frames and an audio feed from a transmitting device of the video call. Determination component 198 may also be configured to determine, upon generating the one or more artificial frames, whether the one or more artificial frames are suitable for a facial model call. Determination component 198 may also be configured to combine, upon determining that the one or more artificial frames are suitable, the one or more artificial frames with the audio feed of the transmitting device. Determination component 198 may also be configured to establish, if the one or more artificial frames are suitable, a facial model call based on a combination of the one or more artificial frames and the audio feed from the transmitting device. Determination component 198 may also be configured to switch from the facial model call to a traditional video call when the connection of the video call is no longer interrupted.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^{\mu} * 15$ kHz, where µ is the numerology 0 to 4. As such, the numerology µ=0 has a subcarrier spacing of 15 kHz and the numerology µ=4 has a subcarrier spacing of 240 kHz. The symbol length/duration is inversely related to the subcarrier spacing. FIGS. 2A-2D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
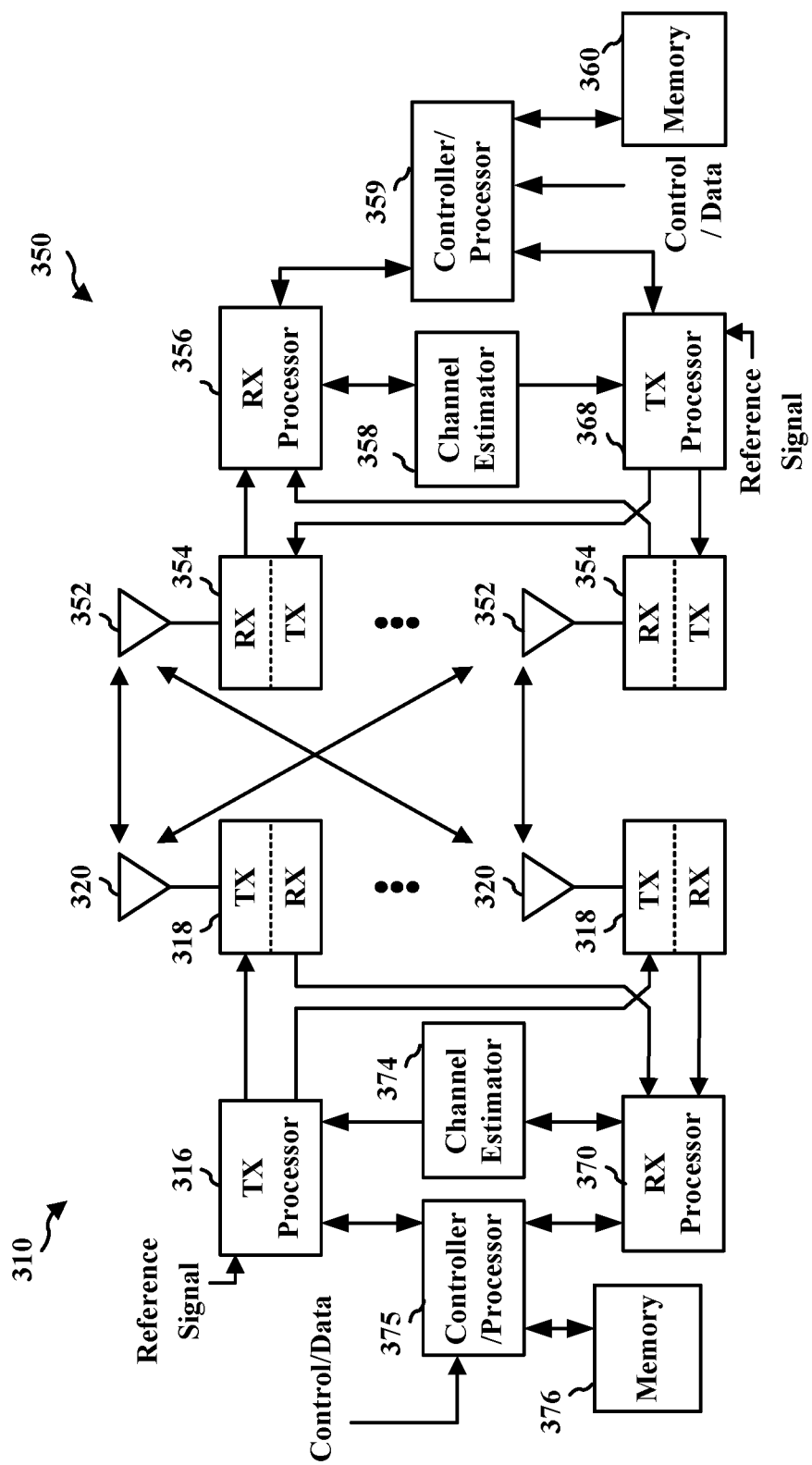
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the base station 310 in a manner similar to that described in connection with the receiver function at the UE 350. Each receiver 318 RX receives a signal through its respective antenna 320. Each receiver 318 RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

As wireless technology for video calls becomes increasingly advanced, e.g., with 4G LTE and 5G new radio (NR) technologies, network connectivity issues still remain prevalent. In some instances, these network connectivity issues may result in the continuity of video calls becoming hampered or interrupted. For example, multiple devices, e.g., device A and device B, may be communicating via a normal video call, but device A may experience a connectivity issue. That is, device A's frames may drop or device A may shift to an audio call. Although device B never experienced a connectivity issue, device B may still suffer from device A's connectivity issue. Accordingly, it can be irritating to a user of device B to experience a video call interruption when there was no connectivity issue on their end.

As indicated herein, in some aspects of video calls, a call interruption or connectivity issue may result in one or more frames of the call being dropped. Further, in some aspects of video calls with multiple devices, one device's frames may drop, e.g., device A, and the other device, e.g., device B, may suffer a call interruption or connectivity issue. Based on this, it may be beneficial to provide a solution for video call interruptions and/or network connectivity issues during video calls. For instance, it may be beneficial to maintain a video call connection at one device when one or more frames are dropped from another device. As such, it may be beneficial for both devices to maintain network connectivity during a video call when either of the devices experiences connectivity issues.

Aspects of the present disclosure may provide a solution for video call interruptions and/or network connectivity issues during video calls. For instance, aspects of the present disclosure may help to maintain video call connections at one device when one or more frames are dropped from another device. Moreover, aspects of the present disclosure may allow for one device to maintain network connectivity during a video call when another device experiences connectivity issues.

In one example of a video call, the video call may include multiple devices, e.g., device A and device B. At the start of the video call, device A's frames may be transferred smoothly to device B. Aspects of the present disclosure may potentially utilize the frames which are already received by device B in order to generate artificial frames for a facial model call. In some instances, both a user at device A, i.e., user A, and a user at device B, i.e., user B, may have a smooth experience using the audio feed exclusively if the video portion of the call is interrupted. Aspects of the present disclosure can also utilize a facial synthesis to build a facial model based on one or more techniques, such as by using generative adversarial networks (GANs) or neural networks (NNs).

After a video call has been established, aspects of the present disclosure may construct a facial model on device B of device A's user, i.e., a model of the face of user A. This facial model may be constructed after a certain duration of the video call. Additionally, after a certain duration of time, aspects of the present disclosure may construct a facial model of device B's user, i.e., user B, on device A. That is, a certain duration of the video call may need to be established prior to creating a facial model. This duration of the video call may depend on a number of factors, e.g., the compute power of specific processors, and/or may be determined based on various testing procedures.

Figure 4:
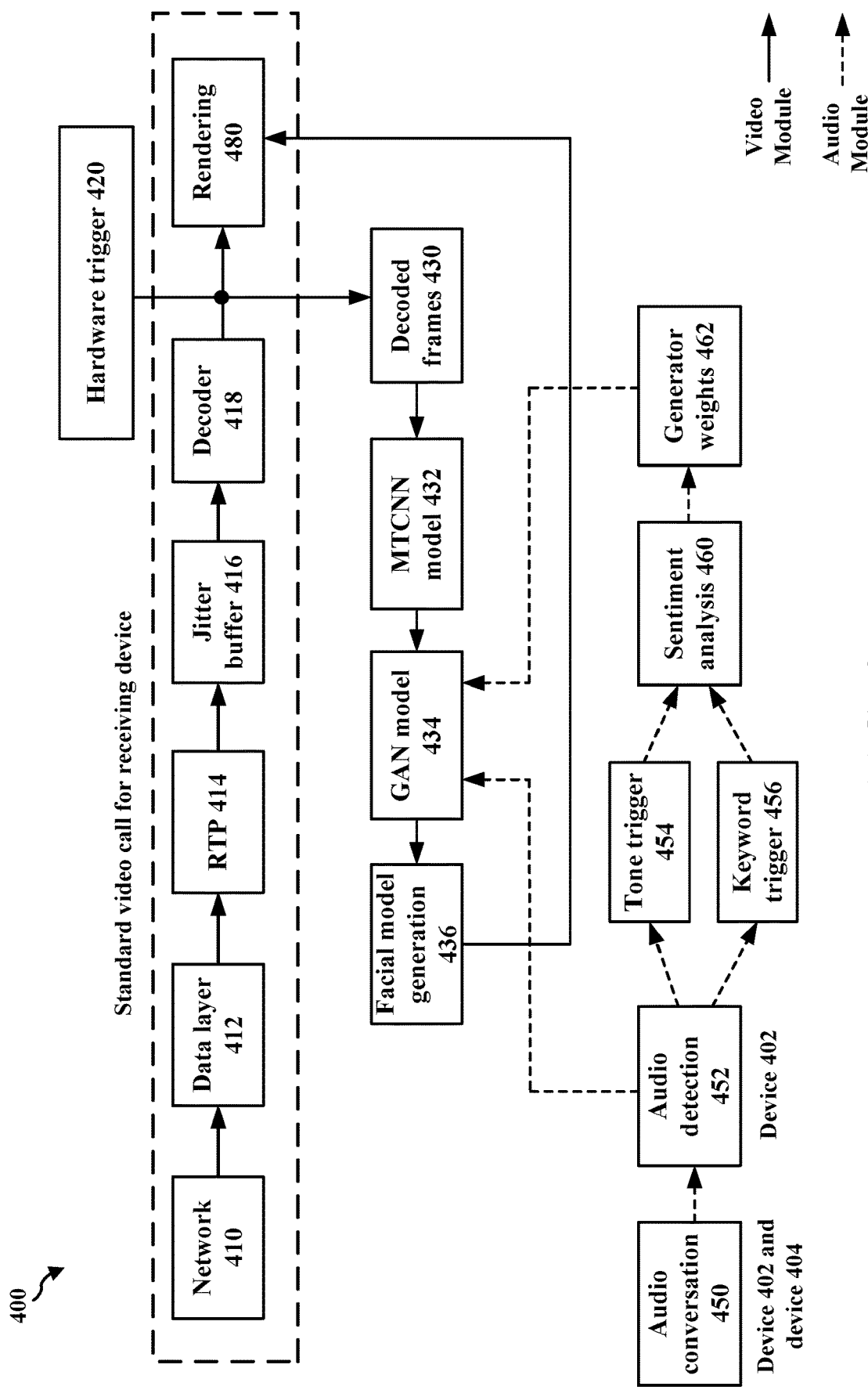
FIG. 4 is a diagram illustrating an example facial model generation.

FIG. 4 is a diagram 400 illustrating an example facial model generation. As shown in FIG. 4, diagram 400 includes a network 410, data layer 412, real-time transport protocol (RTP) component 414, jitter buffer 416, decoder 418, and rendering component 480. As shown in FIG. 4, each of these components may be involved in a standard video call for a receiving device, e.g., device 404 or device B. Diagram 400 also includes, hardware trigger component 420 (i.e., used to detect suitable frames), decoded frames 430, multi-task cascaded convolutional neural network (MTCNN) model 432, GAN model 434, and facial model generation component 436. As depicted in FIG. 4, each of the aforementioned components may be part of a video module. Diagram 400 also includes audio conversation 450 (between device 402 and device 404), audio detection component 452 (for device 402 or device A), tone trigger 454, keyword trigger 456, sentiment analysis 460, and generator weights 462. As illustrated in FIG. 4, each of these components may be part of an audio module.

As shown in FIG. 4, diagram 400 includes a pipeline at a receiving device, e.g., device 404 or device B, in a video call with a transmitting device, e.g., device 402 or device A. Diagram 400 depicts that a facial model may be built at the receiving device, e.g., device 404 or device B, based on the video call with a transmitting device, e.g., device 402 or device A. As illustrated in FIG. 4, a video call for the receiving device, e.g., device 404 or device B, may involve communication between network 410, data layer 412, RTP component 414, jitter buffer 416, decoder 418, and rendering component 480. In some aspects, the hardware trigger 420 may detect suitable frames and may communicate the suitable decoded frames 430 from decoder 418 and utilize MTCNN model 432 and GAN model 434 in order to generate a facial model at facial model generation component 436. The facial model generation may also utilize the audio conversation 450 between device A and device B, the audio detection 452 at device A, the tone trigger 454, the keyword trigger 456, sentiment analysis 460, and generator weights. More specifically, audio detection component 452 and generator weights 462 may be utilized by GAN model 434 in order to generate the facial model at facial model generation component 436. Further, the facial models generated by facial model generation component 436 may be utilized by rendering component 480 in order to render or establish the facial model call at device 404 or device B.

As shown in FIG. 4, some aspects of the present disclosure may include a hardware trigger, e.g., hardware trigger component 420. In some instances, this hardware trigger may provide the suitable or acceptable video frames to the model. Suitable frames may correspond to received frames with no packet loss or no corruption. Additionally, suitable or acceptable frames may be based on a face visibility, a best bitrate among the received frames, and/or use artificial intelligence (AI) upscaling to improve the quality of frames to be sent to the model.

Moreover, as shown in FIG. 4, aspects of the present disclosure may include a sentiment analysis, e.g., sentiment analysis 460. For instance, aspects of the present disclosure may utilize real-time voice samples in addition to generated video. Further, aspects of the present disclosure may modify facial expressions according to the different kinds of emotions a user might be experiencing. In some aspects, a sentiment analysis module may include extrapolation techniques which can output a certain sentiment, which may then be fed to a generator.

In some instances, over the course of various frames for the video call, the background of the video call may remain the same, so a GAN model, e.g., GAN model 434, may be provided with facial information of the user. For instance, a multi-task cascaded neural network (MTCNN), e.g., MTCNN model 432, may be used for this process. Further, the MTCNN may be utilized for purposes other than providing facial information. For instance, aspects of the present disclosure may identify key facial positions or facial landmarks, e.g., five (5) facial landmarks, of a user, e.g., two (2) landmarks for the eyes, two (2) for the mouth, and one (1) for the nose. These features may be used to change the weights of generators according to sentiment triggers from the audio feed. Also, tone triggers may be based on a language analysis. In some instances, certain keyword triggers, e.g., "congratulations," "sigh," etc., may be set to control a face in the facial model call.

Figure 5:
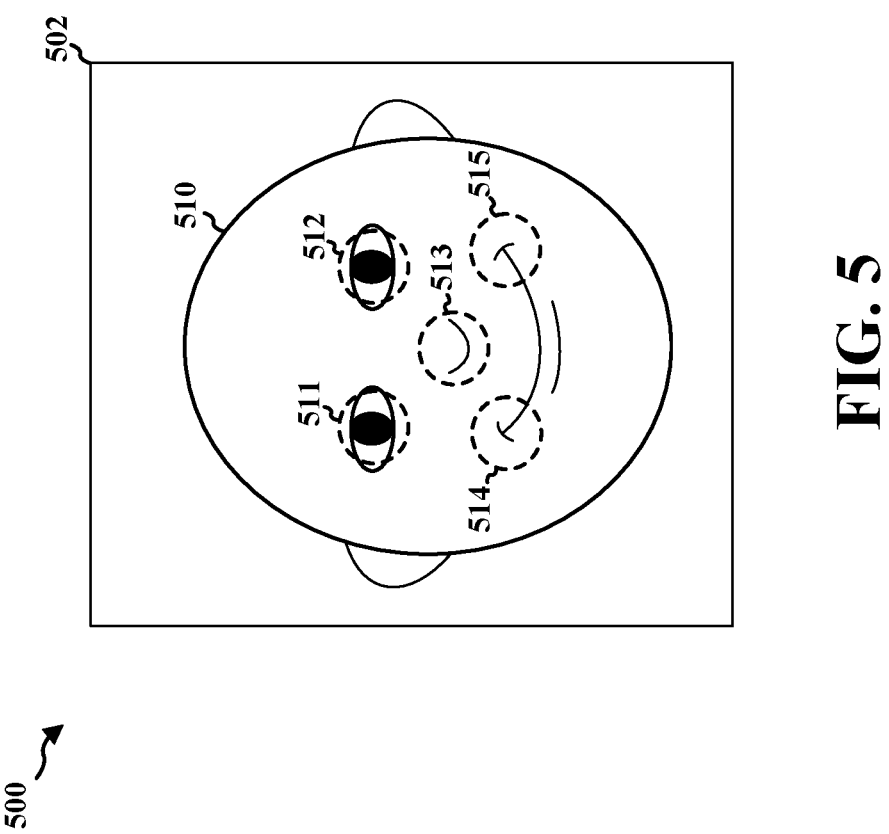
FIG. 5 is a diagram illustrating an example facial landmark identification.

FIG. 5 is a diagram 500 illustrating an example facial landmark identification. More specifically, FIG. 5 displays a diagram 500 of a face of a user 510 in frame 502 for a facial model call. As shown in FIG. 5, the face of the user 510 in frame 502 may be utilized to generate one or more artificial frames for a facial model call. As indicated above, when generating artificial frames for a facial model call, aspects of the present disclosure may identify key positions of facial landmarks of a user, e.g., five (5) facial landmarks. For example, aspects of the present disclosure may identify two facial landmarks for the eyes of the user 510, e.g., landmarks 511 and 512, one facial landmark for the nose of the user 510, e.g., landmark 513, and two facial landmarks for the mouth of the user 510, landmarks 514 and 515.

In some aspects, an artificial frame generation process may utilize multiple neural networks, e.g., a generative network and an adversarial network. These multiple types of neural networks may be utilized in a training process for the generation of the artificial frames. A generative network may utilize forward propagation, i.e., generation and classification. Also, a discriminative or adversarial network may utilize backward propagation, i.e., adversarial training. In some instances, after a facial model training process, users may not be able to distinguish real frames compared to artificial frames.

Figure 6:
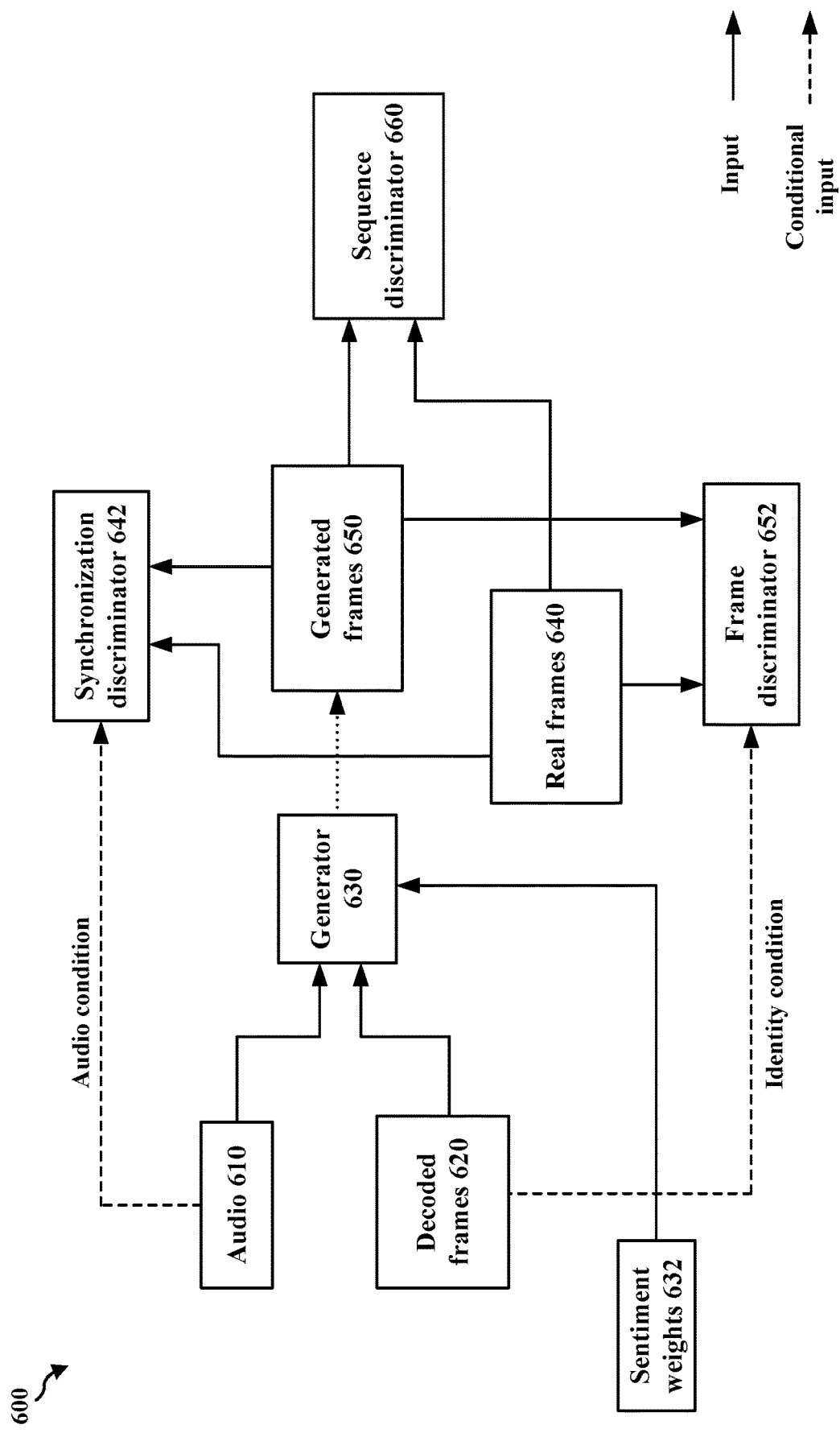
FIG. 6 is a diagram illustrating an example facial model generation.

FIG. 6 is a diagram 600 illustrating an example facial model generation. More specifically, FIG. 6 shows an artificial frame generation process or a facial synthesis process according to the present disclosure that utilizes GANs or neural networks. As shown in FIG. 6, diagram 600 includes audio 610, decoded frames 620, generator 630, sentiment weights 632, real frames 640, synchronization discriminator 642, generated frames 650, frame discriminator 652, and sequence discriminator 660. Diagram 600 depicts that generator 630 may generate frames, e.g., generated frames 650, based on audio 610, decoded frames 620, and sentiment weights 632. The audio condition of audio 610 may be analyzed by synchronization discriminator 642, along with real frames 640 and generated frames 650. Also, the identity condition of decoded frames 620 may be analyzed by frame discriminator 652, along with real frames 640 and generated frames 650. Sequence discriminator 660 may also analyze the generated frames 650 and the real frames 640. As shown in FIG. 6, the audio condition step and the identity condition step may be conditional inputs, while the other steps in diagram 600 may be inputs.

In one aspect, a user of device A may establish a video call with a user of device B, and both device A and device B may have a good connection initially. After a certain duration, e.g., a duration of length 'n', aspects of the present disclosure may construct a video call model of the user of device A on device B. For instance, a facial model of user A, i.e., the user of device A, may be constructed on device B, e.g., a UE or smart phone. Similarly, a facial model of user B, i.e., the user of device B, may be constructed on user A's device, e.g., a UE or smart phone. If the video communication drops or is interrupted, aspects of the present disclosure may implement a facial model call by utilizing the audio feed from the other device along with the constructed facial model. For example, if the video communication from device A drops or is interrupted, a facial model call may be activated at device B by utilizing the audio feed from device A combined with the constructed facial model of user A. Accordingly, a facial model call at device B may comprise one or more artificial frames of user A that are generated at device B, as well as the audio feed from device A. Likewise, a facial model call at device A may comprise one or more artificial frames of user B that are generated at device A, as well as the audio feed from device B.

Figure 7:
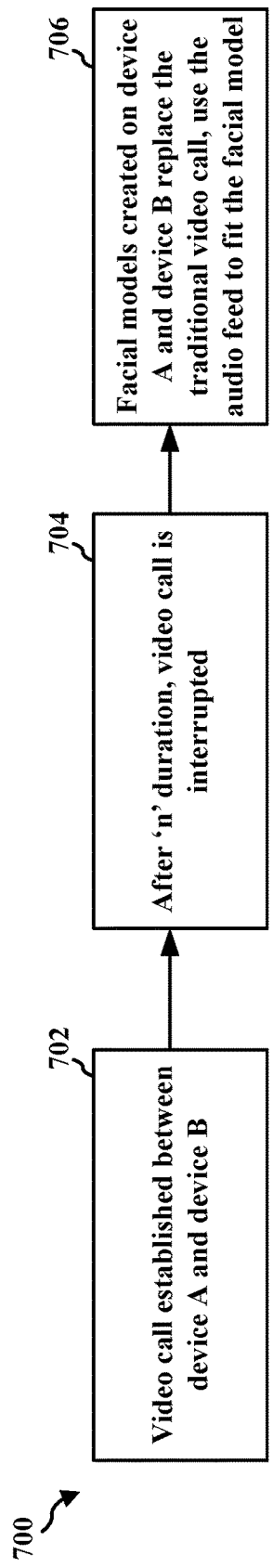
FIG. 7A is a flowchart of a method of wireless communication.
FIG. 7B is a flowchart of a method of wireless communication.
FIG. 7C is a flowchart of a method of wireless communication.

FIGS. 7A, 7B, and 7C display flowcharts 700, 720, and 740, respectively, of methods of wireless communication.

As shown in FIG. 7A, in one example, at 702, a video call may be established between a user of device A and a user of device B. At 704, after a certain duration, e.g., a duration of length 'n', the video call may be interrupted or one or more frames in the call may be dropped. At 706, facial models created on device A and device B may replace the traditional real-time video call on both devices, i.e., device A and device B. Accordingly, device A and device B may utilize the audio feed from the other device to combine with the one or more artificial frames to generate the facial model call.

As shown in FIG. 7B, in another example, at 722, a video call may be established between a user of device A, i.e., user A, and a user of device B, i.e., user B. At 724, it may be determined that the video call is relatively short in length, i.e., such that a threshold duration is not exceeded, and the video call may be interrupted or at least one frame may be dropped. At 726, there may be a traditional switch to an audio call as the facial models may not be constructed prior to the threshold duration. As the facial models may not be created prior to the threshold duration in this situation, aspects of the present disclosure may not implement a facial model call, so the interrupted video call may transition to a traditional audio call.

As shown in FIG. 7C, in another example, at 742, a facial model call may be established between a user of device A, i.e., user A, and a user of device B, i.e., user B. During the facial model call, the video connection may be interrupted or one or more frames may be dropped. However, at 744, the video connection may be re-established in a relatively short amount of time. At 746, as the video connection is re-established quickly, aspects of the present disclosure may switch back to a traditional video call and stop implementing the facial model call. Accordingly, a facial model call may not be needed if a normal video connection is restored in a timely manner.

Aspects of the present disclosure may introduce continuous calling in a device and provide users the opportunity to maintain video calls without any call drops. Aspects of the present disclosure may be implemented on hardware and a hardware trigger may be used to identify which frames are suitable or acceptable to be used in creating a facial model. This may be a faster method than any standard application of artificial intelligence (AI) or machine learning (ML), which involves an additional overhead of going through all the frames to determine which frame is suitable or acceptable for facial model creation. Aspects of the present disclosure may leverage the hardware in this feature of continuous video calling. Aspects of the present disclosure may include a sentiment analysis module to recreate an acceptable video call, which may be faster compared to a standard software solution. Additionally, aspects of the present disclosure may include a call switching feature between a facial model call and a real-time video call, e.g., when a network connectivity returns.

In some instances, aspects of the present disclosure may include a real-time synchronization in replacing the facial model in the call at the same instant that the call drops. Additionally, the model of a transmitting device may be generated on a receiving device for that particular call. Accordingly, this model may be stored in a temporary memory at the receiving device for the duration of the call. Further, aspects of the present disclosure may create two separate models if two user faces are present at the start of the call. However, if a second user joins in the duration when the call was interrupted, there may be no way to recreate those frames, so an audio feed may be utilized for the second user.

Figure 8:
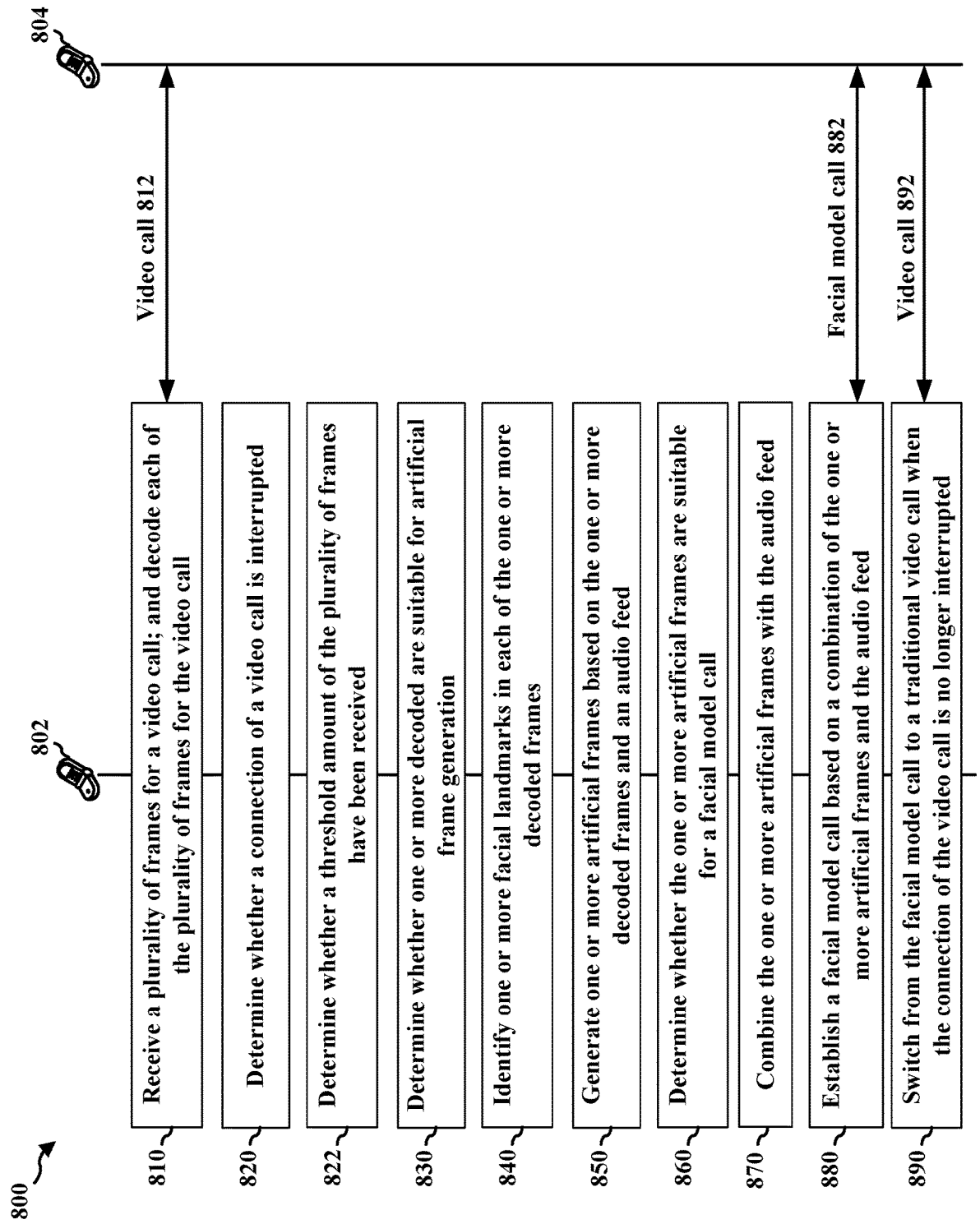
FIG. 8 is a diagram illustrating example communication between a UE and a base station.

FIG. 8 is a diagram 800 illustrating communication between a wireless device or UE 802 and a wireless device or UE 804. The wireless device 802 may correspond to UE 104, 350, device 402, device 404, and apparatus 1002.

At 810, wireless device 802 may receive a plurality of frames for a video call, e.g., video call 812, and decode each of the plurality of frames for the video call, such that the plurality of frames corresponds to the plurality of decoded frames. The wireless device 802 may be a UE, where the one or more artificial frames may be stored in a local memory of the UE.

At 820, wireless device 802 may determine whether a connection of a video call is interrupted, e.g., video call 812, the video call including a plurality of decoded frames.

At 822, wireless device 802 may determine, if the connection of the video call is interrupted, e.g., video call 812, whether a threshold amount of the plurality of frames have been received, where the one or more decoded frames are determined to be suitable based on whether the threshold amount of the plurality of frames have been received.

At 830, wireless device 802 may determine, if the connection of the video call is interrupted, whether one or more decoded frames of the plurality of decoded frames are suitable for artificial frame generation. In some instances, each of the one or more decoded frames may be determined to be suitable for artificial frame generation based on at least one of a facial visibility of the frame, a bit rate of the frame, or a packet loss or corruption of the frame. Also, information corresponding to at least one of the facial visibility of the frame, the bit rate of the frame, or the packet loss or corruption of the frame may be received from a video module or video firmware.

At 840, wireless device 802 may identify, if the one or more decoded frames are suitable for artificial frame generation, one or more facial landmarks in each of the one or more decoded frames, where each of the one or more artificial frames are generated based on the one or more facial landmarks. The one or more facial landmarks in each of the one or more decoded frames may be adjusted based on at least one of one or more tone triggers or one or more keyword triggers.

At 850, wireless device 802 may generate, if the one or more decoded frames are suitable, one or more artificial frames based on the one or more decoded frames and an audio feed from a transmitting device of the video call. The one or more artificial frames may be generated based on one or more sentiment weights. Also, the one or more sentiment weights may be based on at least one of one or more tone triggers or one or more keyword triggers.

At 860, wireless device 802 may determine, upon generating the one or more artificial frames, whether the one or more artificial frames are suitable for a facial model call. The one or more artificial frames may be determined to be suitable based on at least one of a synchronization of the one or more artificial frames with the audio feed, a comparison of the one or more artificial frames with the one or more decoded frames, or a sequence of the one or more artificial frames. The comparison with the one or more decoded frames may be based on a quality or definition of the one or more artificial frames. The sequence of the one or more artificial frames may be based on an adjustment between successive frames being less than a threshold. The one or more artificial frames may be determined to be suitable by at least one neural network (NN) or at least one discriminator.

At 870, wireless device 802 may combine, upon determining that the one or more artificial frames are suitable, the one or more artificial frames with the audio feed of the transmitting device.

At 880, wireless device 802 may establish, if the one or more artificial frames are suitable, a facial model call, e.g., facial model call 882, based on a combination of the one or more artificial frames and the audio feed from the transmitting device.

At 890, wireless device 802 may switch from the facial model call, e.g., facial model call 882, to a traditional video call, e.g., video call 892, when the connection of the video call is no longer interrupted.

Figure 9:
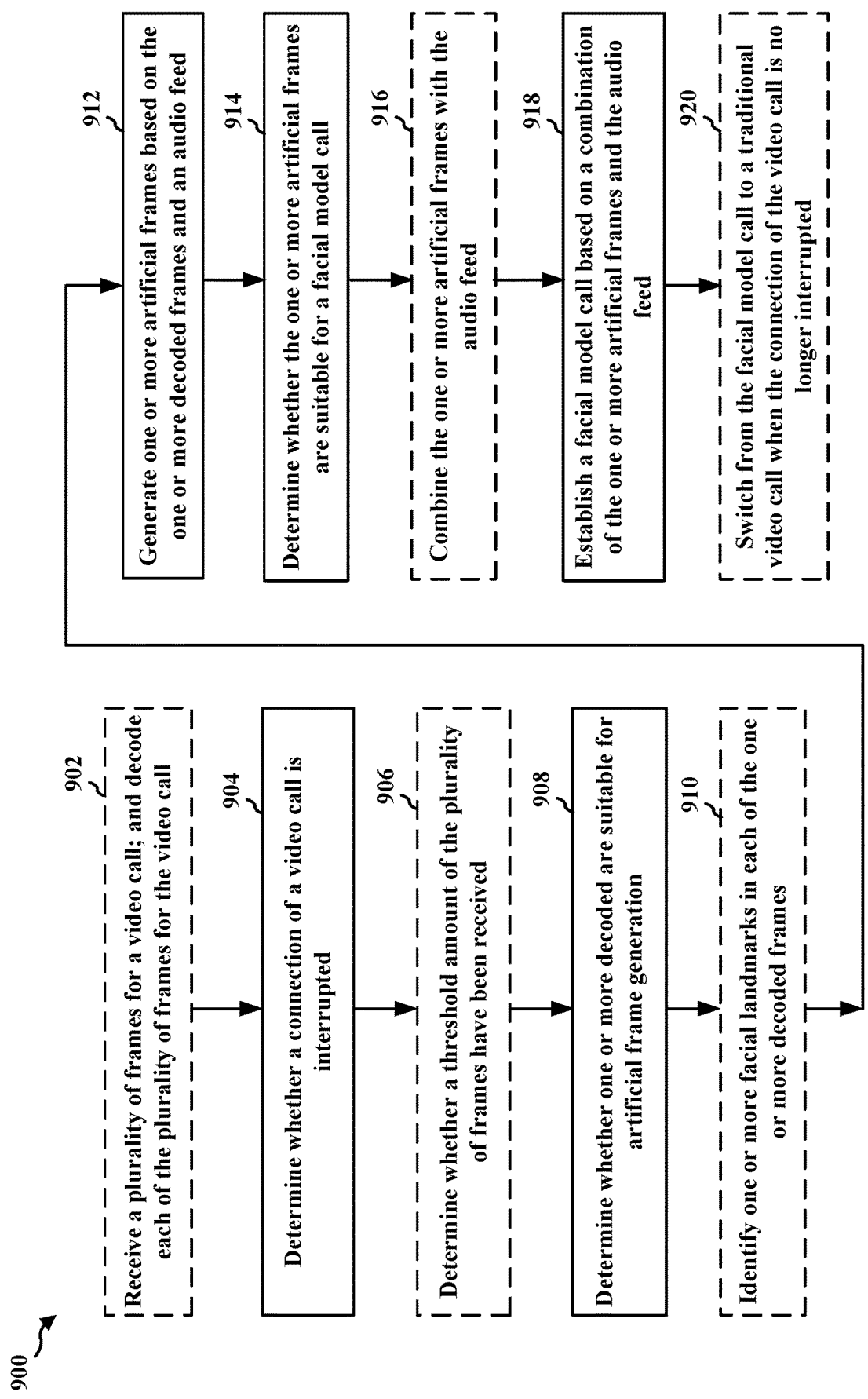
FIG. 9 is a flowchart of a method of wireless communication.

FIG. 9 is a flowchart 900 of a method of wireless communication. The method may be performed by an apparatus, such as a wireless device, a UE, or a component of a UE (e.g., the UE 104, 350, device 402/404; apparatus 1002). Optional aspects are illustrated with a dashed line. The methods described herein can provide a number of benefits, such as improving communication signaling, resource utilization, and/or power savings.

At 902, the apparatus may receive a plurality of frames for the video call; and decode each of the plurality of frames for the video call, such that the plurality of frames corresponds to the plurality of decoded frames, as described in connection with the examples in FIGS. 4-8. For example, as described in 810 of FIG. 8, wireless device 802 may receive a plurality of frames for the video call; and decode each of the plurality of frames for the video call, such that the plurality of frames corresponds to the plurality of decoded frames. Further, 902 may be performed by determination component 1040 in FIG. 10. The wireless device may be a UE, the one or more artificial frames being stored in a local memory of the UE.

At 904, the apparatus may determine whether a connection of a video call is interrupted, the video call including a plurality of decoded frames, as described in connection with the examples in FIGS. 4-8. For example, as described in 820 of FIG. 8, wireless device 802 may determine whether a connection of a video call is interrupted, the video call including a plurality of decoded frames. Further, 904 may be performed by determination component 1040 in FIG. 10.

At 906, the apparatus may determine, if the connection of the video call is interrupted, whether a threshold amount of the plurality of frames have been received, where the one or more decoded frames are determined to be suitable based on whether the threshold amount of the plurality of frames have been received, as described in connection with the examples in FIGS. 4-8. For example, as described in 822 of FIG. 8, wireless device 802 may determine, if the connection of the video call is interrupted, whether a threshold amount of the plurality of frames have been received, where the one or more decoded frames are determined to be suitable based on whether the threshold amount of the plurality of frames have been received. Further, 906 may be performed by determination component 1040 in FIG. 10.

At 908, the apparatus may determine, if the connection of the video call is interrupted, whether one or more decoded frames of the plurality of decoded frames are suitable for artificial frame generation, as described in connection with the examples in FIGS. 4-8. For example, as described in 830 of FIG. 8, wireless device 802 may determine, if the connection of the video call is interrupted, whether one or more decoded frames of the plurality of decoded frames are suitable for artificial frame generation. Further, 908 may be performed by determination component 1040 in FIG. 10. In some instances, each of the one or more decoded frames may be determined to be suitable for artificial frame generation based on at least one of a facial visibility of the frame, a bit rate of the frame, or a packet loss or corruption of the frame. Also, information corresponding to at least one of the facial visibility of the frame, the bit rate of the frame, or the packet loss or corruption of the frame may be received from a video module or video firmware.

At 910, the apparatus may identify, if the one or more decoded frames are suitable for artificial frame generation, one or more facial landmarks in each of the one or more decoded frames, where each of the one or more artificial frames are generated based on the one or more facial landmarks, as described in connection with the examples in FIGS. 4-8. For example, as described in 840 of FIG. 8, wireless device 802 may identify, if the one or more decoded frames are suitable for artificial frame generation, one or more facial landmarks in each of the one or more decoded frames, where each of the one or more artificial frames are generated based on the one or more facial landmarks. Further, 910 may be performed by determination component 1040 in FIG. 10. The one or more facial landmarks in each of the one or more decoded frames may be adjusted based on at least one of one or more tone triggers or one or more keyword triggers.

At 912, the apparatus may generate, if the one or more decoded frames are suitable, one or more artificial frames based on the one or more decoded frames and an audio feed from a transmitting device of the video call, as described in connection with the examples in FIGS. 4-8. For example, as described in 850 of FIG. 8, wireless device 802 may generate, if the one or more decoded frames are suitable, one or more artificial frames based on the one or more decoded frames and an audio feed from a transmitting device of the video call. Further, 912 may be performed by determination component 1040 in FIG. 10. The one or more artificial frames may be generated based on one or more sentiment weights. Also, the one or more sentiment weights may be based on at least one of one or more tone triggers or one or more keyword triggers.

At 914, the apparatus may determine, upon generating the one or more artificial frames, whether the one or more artificial frames are suitable for a facial model call, as described in connection with the examples in FIGS. 4-8. For example, as described in 860 of FIG. 8, wireless device 802 may determine, upon generating the one or more artificial frames, whether the one or more artificial frames are suitable for a facial model call. Further, 914 may be performed by determination component 1040 in FIG. 10. The one or more artificial frames may be determined to be suitable based on at least one of a synchronization of the one or more artificial frames with the audio feed, a comparison of the one or more artificial frames with the one or more decoded frames, or a sequence of the one or more artificial frames. The comparison with the one or more decoded frames may be based on a quality or definition of the one or more artificial frames. The sequence of the one or more artificial frames may be based on an adjustment between successive frames being less than a threshold. The one or more artificial frames may be determined to be suitable by at least one neural network (NN) or at least one discriminator.

At 916, the apparatus may combine, upon determining that the one or more artificial frames are suitable, the one or more artificial frames with the audio feed of the transmitting device, as described in connection with the examples in FIGS. 4-8. For example, as described in 870 of FIG. 8, wireless device 802 may combine, upon determining that the one or more artificial frames are suitable, the one or more artificial frames with the audio feed of the transmitting device. Further, 916 may be performed by determination component 1040 in FIG. 10.

At 918, the apparatus may establish, if the one or more artificial frames are suitable, a facial model call based on a combination of the one or more artificial frames and the audio feed from the transmitting device, as described in connection with the examples in FIGS. 4-8. For example, as described in 880 of FIG. 8, wireless device 802 may establish, if the one or more artificial frames are suitable, a facial model call based on a combination of the one or more artificial frames and the audio feed from the transmitting device. Further, 918 may be performed by determination component 1040 in FIG. 10.

At 920, the apparatus may switch from the facial model call to a traditional video call when the connection of the video call is no longer interrupted, as described in connection with the examples in FIGS. 4-8. For example, as described in 890 of FIG. 8, wireless device 802 may switch from the facial model call to a traditional video call when the connection of the video call is no longer interrupted. Further, 920 may be performed by determination component 1040 in FIG. 10.

Figure 10:
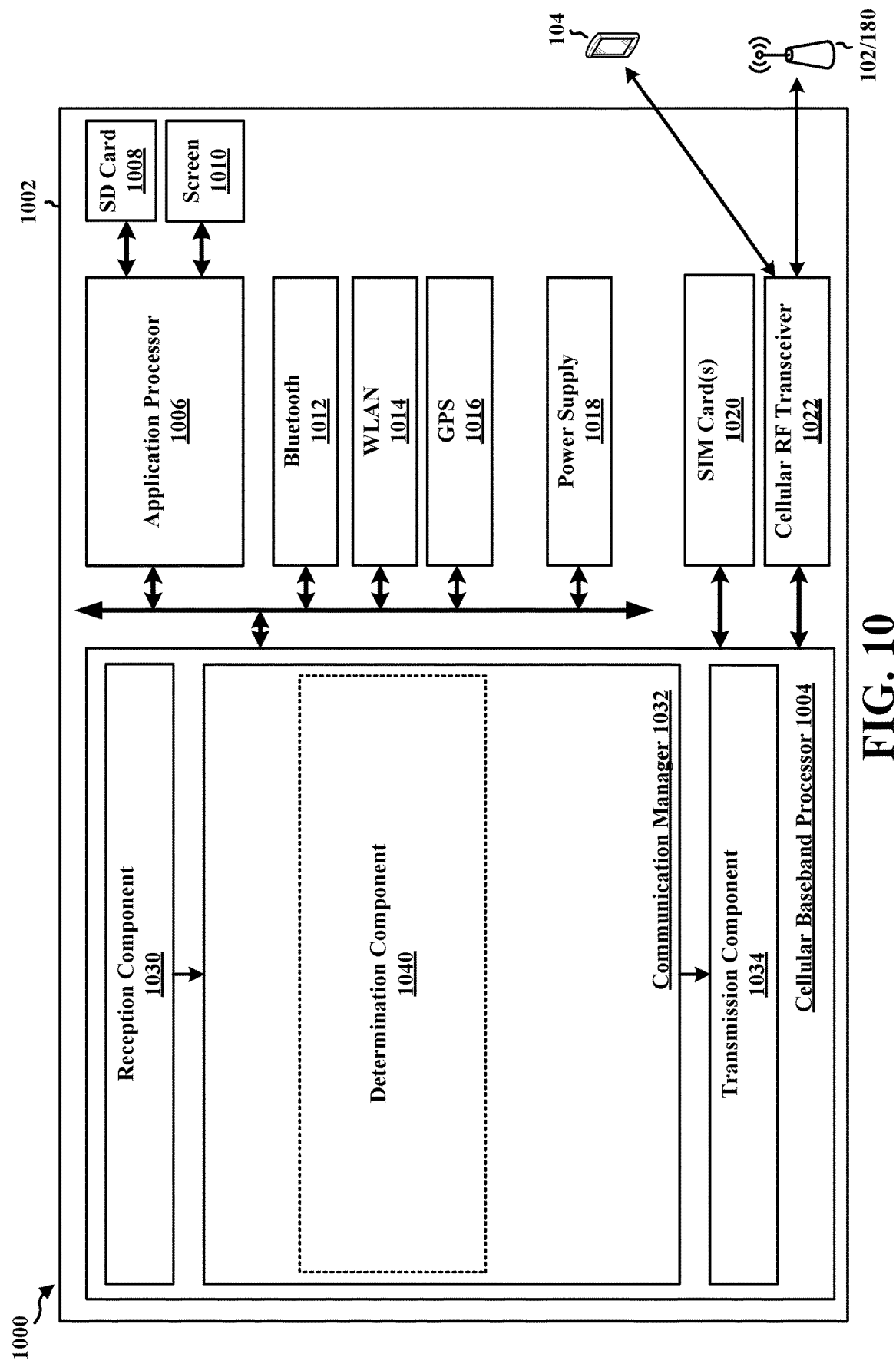
FIG. 10 is a diagram illustrating an example of a hardware implementation for an example apparatus.

FIG. 10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3) and include the aforediscussed additional modules of the apparatus 1002.

The communication manager 1032 includes a determination component 1040 that may be configured to receive a plurality of frames for the video call; and decode each of the plurality of frames for the video call, such that the plurality of frames corresponds to the plurality of decoded frames, e.g., as described in connection with 902 in FIG. 9. Determination component 1040 may also be configured to determine whether a connection of a video call is interrupted, the video call including a plurality of decoded frames, e.g., as described in connection with 904 in FIG. 9. Determination component 1040 may also be configured to determine, if the connection of the video call is interrupted, whether a threshold amount of the plurality of frames have been received, where the one or more decoded frames are determined to be suitable based on whether the threshold amount of the plurality of frames have been received, e.g., as described in connection with 906 in FIG. 9. Determination component 1040 may also be configured to determine, if the connection of the video call is interrupted, whether one or more decoded frames of the plurality of decoded frames are suitable for artificial frame generation, e.g., as described in connection with 908 in FIG. 9. Determination component 1040 may also be configured to identify, if the one or more decoded frames are suitable for artificial frame generation, one or more facial landmarks in each of the one or more decoded frames, where each of the one or more artificial frames are generated based on the one or more facial landmarks, e.g., as described in connection with 910 in FIG. 9. Determination component 1040 may also be configured to generate, if the one or more decoded frames are suitable, one or more artificial frames based on the one or more decoded frames and an audio feed from a transmitting device of the video call, e.g., as described in connection with 912 in FIG. 9. Determination component 1040 may also be configured to determine, upon generating the one or more artificial frames, whether the one or more artificial frames are suitable for a facial model call, e.g., as described in connection with 914 in FIG. 9. Determination component 1040 may also be configured to combine, upon determining that the one or more artificial frames are suitable, the one or more artificial frames with the audio feed of the transmitting device, e.g., as described in connection with 916 in FIG. 9. Determination component 1040 may also be configured to establish, if the one or more artificial frames are suitable, a facial model call based on a combination of the one or more artificial frames and the audio feed from the transmitting device, e.g., as described in connection with 918 in FIG. 9. Determination component 1040 may also be configured to switch from the facial model call to a traditional video call when the connection of the video call is no longer interrupted, e.g., as described in connection with 920 in FIG. 9.

The apparatus may include additional components that perform each of the blocks of the algorithm in the aforementioned flowcharts of FIGS. 8 and 9. As such, each block in the aforementioned flowcharts of FIGS. 8 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for receiving a plurality of frames for the video call; means for decoding each of the plurality of frames for the video call, such that the plurality of frames corresponds to the plurality of decoded frames; means for determining whether a connection of a video call is interrupted, the video call including a plurality of decoded frames; means for determining, if the connection of the video call is interrupted, whether a threshold amount of the plurality of frames have been received, where the one or more decoded frames are determined to be suitable based on whether the threshold amount of the plurality of frames have been received; means for determining, if the connection of the video call is interrupted, whether one or more decoded frames of the plurality of decoded frames are suitable for artificial frame generation; means for identifying, if the one or more decoded frames are suitable for artificial frame generation, one or more facial landmarks in each of the one or more decoded frames, where each of the one or more artificial frames are generated based on the one or more facial landmarks; means for generating, if the one or more decoded frames are suitable, one or more artificial frames based on the one or more decoded frames and an audio feed from a transmitting device of the video call; means for determining, upon generating the one or more artificial frames, whether the one or more artificial frames are suitable for a facial model call; means for combining, upon determining that the one or more artificial frames are suitable, the one or more artificial frames with the audio feed of the transmitting device; means for establishing, if the one or more artificial frames are suitable, a facial model call based on a combination of the one or more artificial frames and the audio feed from the transmitting device; and means for switching from the facial model call to a traditional video call when the connection of the video call is no longer interrupted. The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a wireless device. The method includes determining whether a connection of a video call is interrupted, the video call including a plurality of decoded frames; determining, if the connection of the video call is interrupted, whether one or more decoded frames of the plurality of decoded frames are suitable for artificial frame generation; generating, if the one or more decoded frames are suitable, one or more artificial frames based on the one or more decoded frames and an audio feed from a transmitting device of the video call; determining, upon generating the one or more artificial frames, whether the one or more artificial frames are suitable for a facial model call; and establishing, if the one or more artificial frames are suitable, a facial model call based on a combination of the one or more artificial frames and the audio feed from the transmitting device.

Aspect 2 is the method of aspect 1, further including determining, if the connection of the video call is interrupted, whether a threshold amount of the plurality of frames have been received, where the one or more decoded frames are determined to be suitable based on whether the threshold amount of the plurality of frames have been received.

Aspect 3 is the method of any of aspects 1 and 2, further including identifying, if the one or more decoded frames are suitable for artificial frame generation, one or more facial landmarks in each of the one or more decoded frames, where each of the one or more artificial frames are generated based on the one or more facial landmarks.

Aspect 4 is the method of any of aspects 1 to 3, where the one or more facial landmarks in each of the one or more decoded frames are adjusted based on at least one of one or more tone triggers or one or more keyword triggers.

Aspect 5 is the method of any of aspects 1 to 4, further including switching from the facial model call to a traditional video call when the connection of the video call is no longer interrupted.

Aspect 6 is the method of any of aspects 1 to 5, where the one or more artificial frames are determined to be suitable based on at least one of a synchronization of the one or more artificial frames with the audio feed, a comparison of the one or more artificial frames with the one or more decoded frames, or a sequence of the one or more artificial frames.

Aspect 7 is the method of any of aspects 1 to 6, where the comparison with the one or more decoded frames is based on a quality or definition of the one or more artificial frames.

Aspect 8 is the method of any of aspects 1 to 7, where the sequence of the one or more artificial frames is based on an adjustment between successive frames being less than a threshold.

Aspect 9 is the method of any of aspects 1 to 8, where the one or more artificial frames are generated based on one or more sentiment weights.

Aspect 10 is the method of any of aspects 1 to 9, where the one or more sentiment weights are based on at least one of one or more tone triggers or one or more keyword triggers.

Aspect 11 is the method of any of aspects 1 to 10, further including combining, upon determining that the one or more artificial frames are suitable, the one or more artificial frames with the audio feed of the transmitting device.

Aspect 12 is the method of any of aspects 1 to 11, where each of the one or more decoded frames are determined to be suitable for artificial frame generation based on at least one of a facial visibility of the frame, a bit rate of the frame, or a packet loss or corruption of the frame.

Aspect 13 is the method of any of aspects 1 to 12, where information corresponding to at least one of the facial visibility of the frame, the bit rate of the frame, or the packet loss or corruption of the frame is received from a video module or video firmware.

Aspect 14 is the method of any of aspects 1 to 13, further including receiving a plurality of frames for the video call; and decoding each of the plurality of frames for the video call, such that the plurality of frames corresponds to the plurality of decoded frames.

Aspect 15 is the method of any of aspects 1 to 14 where the wireless device is a user equipment (UE), the one or more artificial frames being stored in a local memory of the UE.

Aspect 16 is the method of any of aspects 1 to 15, where the one or more artificial frames are determined to be suitable by at least one neural network (NN) or at least one discriminator.

Aspect 17 is an apparatus for wireless communication including at least one processor coupled to a memory and configured to implement a method as in any of aspects 1 to 16.

Aspect 18 is an apparatus for wireless communication including means for implementing a method as in any of aspects 1 to 16.

Aspect 19 is a computer-readable medium storing computer executable code, where the code when executed by a processor causes the processor to implement a method as in any of aspects 1 to 16.

What is claimed is:

1. A method of wireless communication of a wireless device, comprising:
   determining that a connection of a video call is interrupted, the video call including a plurality of decoded frames;
   determining that one or more decoded frames of the plurality of decoded frames are suitable for artificial frame generation;
   identifying one or more facial landmarks in each of the one or more decoded frames, wherein the one or more facial landmarks in each of the one or more decoded frames are adjusted based on at least one of one or more tone triggers or one or more keyword triggers;

generating one or more artificial frames based on the one or more decoded frames and an audio feed from a transmitting device of the video call, wherein each of the one or more artificial frames are further generated based on the one or more facial landmarks;

determining that the one or more artificial frames are suitable for a facial model call; and establishing the facial model call based on a combination of the one or more artificial frames and the audio feed from the transmitting device.

2. The method of claim 1, further comprising:
determining that a threshold amount of the plurality of decoded frames have been received, wherein the one or more decoded frames are determined to be suitable based on whether the threshold amount of the plurality of decoded frames have been received.

3. The method of claim 1, further comprising:
switching from the facial model call to a traditional video call based on the connection of the video call no longer being interrupted.

4. The method of claim 1, wherein the one or more artificial frames are determined to be suitable based on at least one of a synchronization of the one or more artificial frames with the audio feed, a comparison of the one or more artificial frames with the one or more decoded frames, or a sequence of the one or more artificial frames.

5. The method of claim 4, wherein the comparison with the one or more decoded frames is based on a quality or definition of the one or more artificial frames.

6. The method of claim 4, wherein the sequence of the one or more artificial frames is based on an adjustment between successive frames being less than a threshold.

7. The method of claim 1, wherein the one or more artificial frames are generated based on a sentiment analysis.

8. The method of claim 7, wherein the sentiment analysis is based on at least one of the one or more tone triggers or the one or more keyword triggers.

9. The method of claim 1, further comprising:
combining the one or more artificial frames with the audio feed of the transmitting device.

10. The method of claim 1, wherein each of the one or more decoded frames are determined to be suitable for the artificial frame generation based on at least one of a facial visibility of the frame, a bit rate of the frame, or a packet loss or corruption of the frame.

11. The method of claim 10, wherein information corresponding to at least one of the facial visibility of the frame, the bit rate of the frame, or the packet loss or corruption of the frame is received from a video module or video firmware.

12. The method of claim 1, further comprising:
receiving a plurality of frames for the video call; and
decoding each of the plurality of frames for the video call, such that the plurality of frames corresponds to the plurality of decoded frames.

13. The method of claim 1, wherein the wireless device is a user equipment (UE), the one or more artificial frames being stored in a local memory of the UE.

14. The method of claim 1, wherein the one or more artificial frames are determined to be suitable by at least one neural network (NN) or at least one discriminator.

15. An apparatus for wireless communication, the apparatus being a wireless device, comprising:
a memory; and
at least one processor coupled to the memory and configured to:
determine that a connection of a video call is interrupted, the video call including a plurality of decoded frames;
determine that one or more decoded frames of the plurality of decoded frames are suitable for artificial frame generation;
identify one or more facial landmarks in each of the one or more decoded frames, wherein the one or more facial landmarks in each of the one or more decoded frames are adjusted based on at least one of one or more tone triggers or one or more keyword triggers;
generate one or more artificial frames based on the one or more decoded frames and an audio feed from a transmitting device of the video call, wherein each of the one or more artificial frames are further generated based on the one or more facial landmarks;
determine that the one or more artificial frames are suitable for a facial model call; and
establish the facial model call based on a combination of the one or more artificial frames and the audio feed from the transmitting device.

16. The apparatus of claim 15, wherein the at least one processor is further configured to:
determine that a threshold amount of the plurality of decoded frames have been received, wherein the one or more decoded frames are determined to be suitable based on whether the threshold amount of the plurality of decoded frames have been received.

17. The apparatus of claim 15, wherein the at least one processor is further configured to:
switch from the facial model call to a traditional video call based on the connection of the video call no longer being interrupted.

18. The apparatus of claim 15, wherein the one or more artificial frames are determined to be suitable based on at least one of a synchronization of the one or more artificial frames with the audio feed, a comparison of the one or more artificial frames with the one or more decoded frames, or a sequence of the one or more artificial frames.

19. The apparatus of claim 18, wherein the comparison with the one or more decoded frames is based on a quality or definition of the one or more artificial frames, wherein the sequence of the one or more artificial frames is based on an adjustment between successive frames being less than a threshold.

20. The apparatus of claim 15, wherein the one or more artificial frames are generated based on a sentiment analysis, wherein the sentiment analysis is based on at least one of the one or more tone triggers or the one or more keyword triggers.

21. The apparatus of claim 15, wherein the at least one processor is further configured to:
combine the one or more artificial frames with the audio feed of the transmitting device.

22. The apparatus of claim 15, wherein each of the one or more decoded frames are determined to be suitable for the artificial frame generation based on at least one of a facial visibility of the frame, a bit rate of the frame, or a packet loss or corruption of the frame, wherein information corresponding to at least one of the facial visibility of the frame, the bit rate of the frame, or the packet loss or corruption of the frame is received from a video module or video firmware.

23. The apparatus of claim 15, wherein the at least one processor is further configured to:
receive a plurality of frames for the video call; and decode each of the plurality of frames for the video call, such that the plurality of frames corresponds to the plurality of decoded frames.

24. The apparatus of claim 15, wherein the wireless device is a user equipment (UE), the one or more artificial frames being stored in a local memory of the UE.

25. An apparatus for wireless communication, comprising:
- means for determining that a connection of a video call is interrupted, the video call including a plurality of decoded frames;
- means for determining that one or more decoded frames of the plurality of decoded frames are suitable for artificial frame generation;
- means for identifying one or more facial landmarks in each of the one or more decoded frames, wherein the one or more facial landmarks in each of the one or more decoded frames are adjusted based on at least one of one or more tone triggers or one or more keyword triggers;
- means for generating one or more artificial frames based on the one or more decoded frames and an audio feed from a transmitting device of the video call, wherein each of the one or more artificial frames are further generated based on the one or more facial landmarks;
- means for determining that the one or more artificial frames are suitable for a facial model call; and
- means for establishing the facial model call based on a combination of the one or more artificial frames and the audio feed from the transmitting device.

26. A non-transitory computer-readable medium storing computer executable code for wireless communication, the code when executed by a processor causes the processor to:
- determine that a connection of a video call is interrupted, the video call including a plurality of decoded frames;
- determine that one or more decoded frames of the plurality of decoded frames are suitable for artificial frame generation;
- identify one or more facial landmarks in each of the one or more decoded frames, wherein the one or more facial landmarks in each of the one or more decoded frames are adjusted based on at least one of one or more tone triggers or one or more keyword triggers;
- generate one or more artificial frames based on the one or more decoded frames and an audio feed from a transmitting device of the video call, wherein each of the one or more artificial frames are further generated based on the one or more facial landmarks;
- determine that the one or more artificial frames are suitable for a facial model call; and
- establish the facial model call based on a combination of the one or more artificial frames and the audio feed from the transmitting device.

* * * * *